(12) United States Patent  
Kreling et al.

(10) Patent No.: US 9,134,466 B2  
(45) Date of Patent: Sep. 15, 2015

(54) MIRROR HAVING REFLECTIVE LAYER OF OR INCLUDING SILICON ALUMINUM

(71) Applicant: Guardian Industries Corp., Auburn Hills, MI (US)

(72) Inventors: Afonso Kreling, Rio de Janeiro (BR); Fabiola Ramos Torres, Rio de Janeiro (BR); Juan Baillo Abreu, Sao Paulo (BR); Philip J. Lingle, Temperance, MI (US); Jean-Marc Lemmer, Ann Arbor, MI (US); Willem Den Boer, Brighton, MI (US); Alexey Krasnov, Canton, MI (US)

(73) Assignees: Guardian do Brasil Vidros Planos Ltda., Rio de Janeiro (BR); Guardian Industries Corp., Auburn Hills, MI (US)

( * ) Notice: Subject to any disclaimer, the term of this patent is extended or adjusted under 35 U.S.C. 154(b) by 279 days.

(21) Appl. No.: 13/770,364

(22) Filed: Feb. 19, 2013

(65) Prior Publication Data

US 2014/0233119 A1    Aug. 21, 2014

(51) Int. Cl.
G02B 26/08    (2006.01)
G02B 5/08    (2006.01)

(52) U.S. Cl.
CPC .................................. *G02B 5/0808* (2013.01)

(58) Field of Classification Search
CPC .. G02B 5/0858; G02B 5/0808; G02B 5/0833; G02B 5/0825; G02B 5/085; G02B 5/08; B60R 1/08
USPC ........................... 359/849, 838, 839, 871, 604
See application file for complete search history.

(56) References Cited

U.S. PATENT DOCUMENTS

| 6,530,668 | B2 | 3/2003 | Krisko |
| 6,783,253 | B2 | 8/2004 | Thomsen et al. |
| 6,934,085 | B2 | 8/2005 | Stachowiak et al. |
| 7,276,289 | B2 | 10/2007 | Lu et al. |
| 7,678,459 | B2 | 3/2010 | Scott et al. |
| 8,173,263 | B2 | 5/2012 | Lingle et al. |
| 8,187,713 | B2 | 5/2012 | Lemmer et al. |
| 2006/0077580 | A1 | 4/2006 | Wuillaume et al. |
| 2007/0178316 | A1 | 8/2007 | Mellott |
| 2008/0055704 | A1 | 3/2008 | Neidrich et al. |
| 2008/0073203 | A1 | 3/2008 | Wang et al. |
| 2008/0164173 | A1 | 7/2008 | Savakus |
| 2008/0212189 | A1* | 9/2008 | Baur et al. .................... 359/604 |

(Continued)

FOREIGN PATENT DOCUMENTS

| DE | 10 2009 040 785 | 3/2011 |
| DE | 10 2010 039 927 | 3/2012 |
| JP | 11-238574 | 8/1999 |

OTHER PUBLICATIONS

International Search Report mailed May 9, 2014.

(Continued)

*Primary Examiner* — Euncha Cherry  
(74) *Attorney, Agent, or Firm* — Nixon & Vanderhye P.C.

(57) ABSTRACT

Embodiments relate to mirrors having a reflective layer of or including silicon aluminum (e.g., SiAl). The mirrors may be first surface mirrors, or second surface mirrors. The mirrors may be flat or bent in different instances, and may or may not be heat treated. In certain example instances, such mirrors may be used in interior residential, commercial, appliance, and/or other applications.

16 Claims, 3 Drawing Sheets

(56) References Cited

U.S. PATENT DOCUMENTS

| | | |
|---|---|---|
| 2010/0229853 A1 | 9/2010 | Vandal et al. |
| 2010/0259940 A1 | 10/2010 | Chiang et al. |
| 2011/0176212 A1 | 7/2011 | Lu et al. |
| 2011/0176236 A1 | 7/2011 | Lu et al. |

OTHER PUBLICATIONS

U.S. Appl. No. 13/770,262, filed Feb. 19, 2013; Kreling et al.
"Reliability Implications of Nitrogen Contamination During Deposition of Sputtered Aluminum/Silicon Metal Films"; Klema et al., Reliability Physics Symposium, $22^{nd}$ Annual IEEE; Apr. 1, 1984.

* cited by examiner

MIRROR HAVING REFLECTIVE LAYER OF OR INCLUDING SILICON ALUMINUM

FIELD OF THE INVENTION

Certain example embodiments of this invention relate to mirrors and/or methods of making the same. More particularly, certain example embodiments relate to mirrors having a reflective layer of or including silicon aluminum. The mirrors may be first surface mirrors, or second surface mirrors. The mirrors may be flat or bent in different instances, and may or may not be heat treated (e.g., thermally tempered and/or thermally bent). In certain example instances, such mirrors may be used in interior residential, commercial, furniture, appliance, and/or other applications.

BACKGROUND AND SUMMARY OF EXAMPLE EMBODIMENTS OF THE INVENTION

Mirrors have been in existence for years and have been used in interior building applications such as, for example, in bathrooms, as decorations, for furniture, etc., and for exterior applications. Mirrors generally are either (a) first surface mirrors, where the mirror coating is provided between the viewer and the supporting glass substrate, or (b) second surface mirrors, where the supporting glass substrate is interposed between the viewer and the mirror coating. See, for example, U.S. Pat. Nos. 7,276,289 and 7,678,459; U.S. Publication Nos. 2006/0077580; 2007/0178316; 2008/0073203; 2008/0164173; 2010/0229853; 2011/0176212; and 2011/0176236. The entire contents of each of these patent documents is hereby incorporated herein by reference.

Interior mirrors, including home/residential mirrors, are traditionally produced via wet processing, also known as silvering, which allows a highly reflective silver layer and pleasant appearance of the reflected image. However, silvering is expensive, and is not environmentally friendly. Silver also is not particularly durable and, for example, is subject to corrosion when exposed to even building interior environments. Durability problems can be overcome with silver-inclusive mirrors, however, by applying one or more layers of protective paint. Yet these paints are sometimes expensive and, at a minimum, inject time delays in the process because they need to be coated and dried and sometimes re-coated and re-dried. Wet coating techniques also are "messy" and potentially hazardous to humans.

Thus, it will be appreciated that there is a need in the art for improved mirrors and/or methods of making the same. Certain embodiments of this invention solve one or more of the problems discussed above.

Certain example embodiments of this invention relate to a mirror having a reflecting layer of or including an alloy of silicon (Si) and aluminum (Al). Such a reflective layer may be used in first surface mirrors and/or second surface mirrors. Certain example embodiments relate to the use of a sputtering target of or including SiAl, in order to sputter-deposit a reflective layer of or including silicon aluminum on (directly or indirectly) a glass substrate, in making a mirror. Heat formable mirrors may also benefit from the use of sputter-deposited SiAl inclusive reflective layers, which material has been found to sustain little or no mechanical damage or optical change during thermal glass bending, even at some small curvature radii. Thus, example advantages of SiAl mirrors include high mechanical durability, thermal temperability (possibly without the need for additional protective overcoat(s)), thermal bendability without cracking, low cost, and environmental stability.

In certain example embodiments of this invention, there is provided a mirror, comprising: a glass substrate; a metallic or substantially metallic reflective layer comprising silicon aluminum provided on the glass substrate; and wherein the layer comprising silicon aluminum comprises, on a weight basis, from 70-99.98% silicon and from 0.02-30% aluminum,

DETAILED DESCRIPTION OF EXAMPLE EMBODIMENTS OF THE INVENTION

Figure 1:
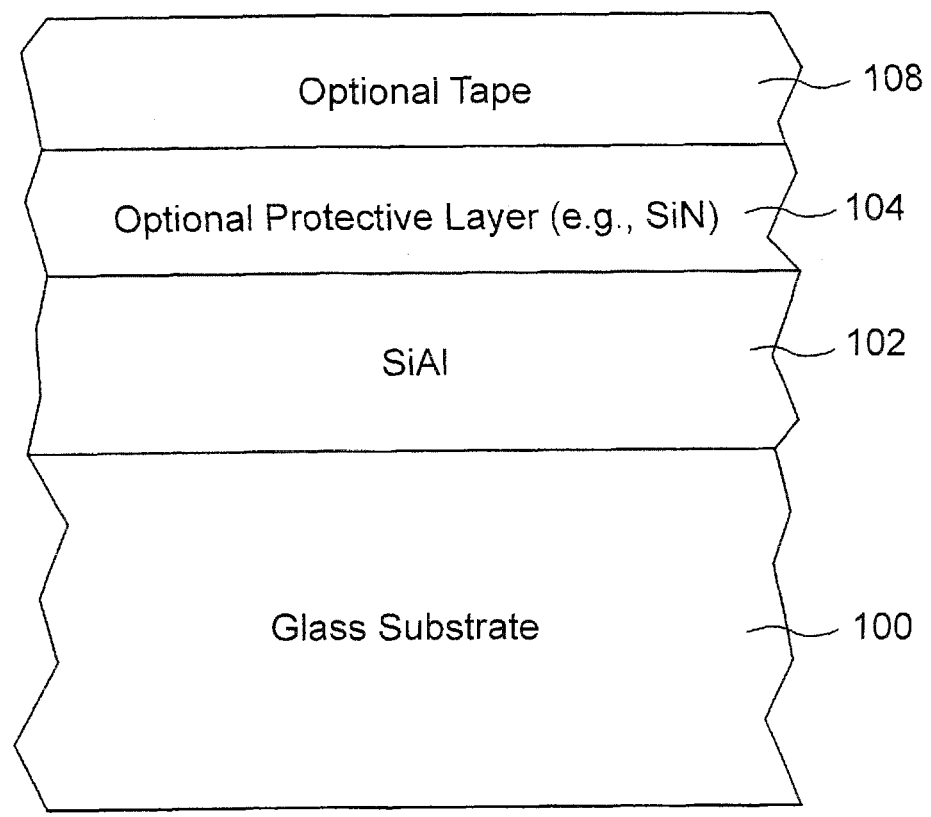
FIG. 1 is a cross sectional view of a mirror in accordance with certain example embodiments of this invention.

Referring now more particularly to the drawings in which reference numerals indicate like parts/materials throughout the several views. Mirrors according to example embodiments of this invention may be flat or bent in different instances, and may or may not be heat treated (e.g., thermally tempered and/or thermally bent). In certain example instances, such mirrors may be used in interior residential, commercial, appliance, furniture, and/or other applications.

Figure 2:
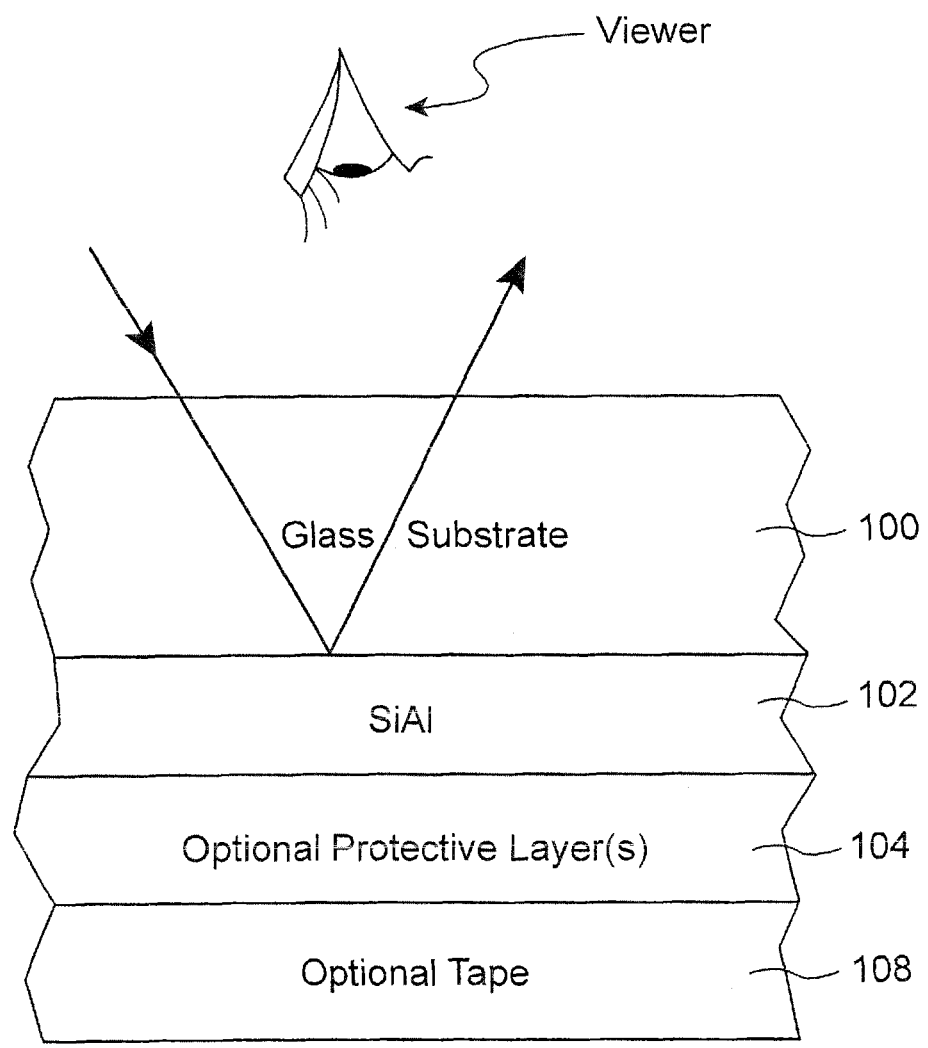
FIG. 2 is a cross sectional view of an example second surface mirror according to an example embodiment of this invention.
Figure 3:
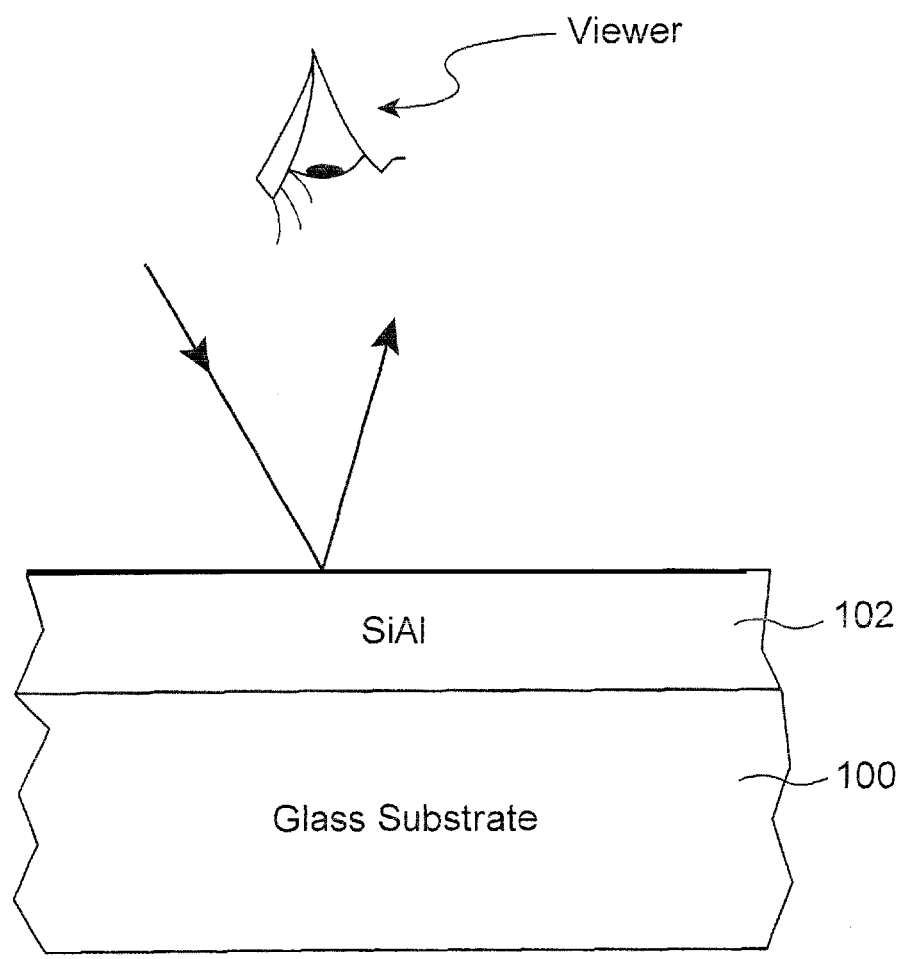
FIG. 3 is a cross sectional view of an example first surface mirror according to an example embodiment of this invention.

Referring to FIGS. 1-3, certain example embodiments of this invention relate to a mirror having a reflecting layer 102 of or including an alloy of silicon (Si) and aluminum (Al) which provides mirrorish reflectance. Such a reflective layer 102 may be used in first surface mirrors (e.g., FIG. 3) and/or second surface mirrors (e.g., FIG. 2). Certain example embodiments relate to the use of a sputtering target of or including SiAl, in order to sputter-deposit a reflective layer 102 of or including silicon aluminum on (directly or indirectly) a glass substrate 100, in making a mirror. While the visible reflectance levels of SiAl are not as high as those of Ag and Al reflective layers in mirrors, SiAl reflective layers 102 can achieve sufficient reflectance levels for applications such as interior/residential mirrors, and may be durable and comparatively inexpensive. Moreover, SiAl mirrors may be used for a number of applications where it is desired for the reflective layer to be semi-transparent in the visible spectral range and highly reflective in the mid-IR spectral region, such as mirrors for commercial appliances such as refrigerators with partially transparent flat or curved doors/panels, funhouse mirrors, basis for astronomical mirrors in a first-surface configuration (with additional reflective layers provided, in addition to the SiAl layer(s)), and so forth. Heat formable mirrors may also benefit from the use of sputter-deposited SiAl inclusive reflective layers, which material has been found to sustain little or no mechanical damage or optical change during thermal glass bending, even at some small curvature radii. Accordingly, the mirrors shown in FIGS. 1-3 may be either flat mirrors, or may be heat-bent mirrors where the glass substrate 100 is thermally bent after the SiAl layer 102 has been sputter-deposited thereon. Thus, advantages of example SiAl mirrors include high mechanical durability, thermal temperability (possibly without the need for additional protective overcoat(s)), thermal bendability without cracking, low cost, and environmental stability. Optionally, transparent dielectric protective layer (e.g., of or including silicon nitride and/or silicon oxynitride) 104 and/or a permanent protective film (PPM) 108 may be applied on the substrate 100 over the reflective layer 102 in any of the FIG. 1-3 embodiments, for added overall durability. The PPF 108 may be applied in solid form in certain example embodiments. And while paint may be provided on mirrors according to example embodiments of this invention, such protective paint is not needed in many applications. Reflected images from mirror according to example embodiments of this inventions may have a brown tint.

FIG. 1 is a cross-sectional view of mirror (first surface mirror or second surface mirror) in accordance with certain example embodiments of this invention. As shown in FIG. 1, a glass substrate 100 supports a mirror coating including reflective/mirror layer 102 of or including silicon aluminum (e.g., SiAl). The mirror coating may optionally include transparent dielectric layer 104 (e.g., of or including one or more of silicon nitride, silicon oxynitride, aluminum nitride, aluminum oxynitride, aluminum oxide, and/or titanium nitride) and/or PPF layer 108 of tape or the like. Metallic or substantially metallic SiAl based reflective layer 102 is sputter-deposited on glass substrate 100, via one or more SiAl sputtering target(s) in an atmosphere of or including inert gas such as argon gas. In certain example embodiments, the SiAl layer 102 is sputter-deposited, via at least one SiAl target, in an argon gas atmosphere that includes little or no oxygen or nitrogen gas. One SiAl layer 102 is provided in the mirror in the illustrated embodiments herein, although it is possible that multiple SiAl layers may be provided. Optional protective layer 104 (e.g., $Si_3N_4$ or other suitable stoichiometry) may also be sputter-deposited on the substrate 100, over the reflective layer 102. Optionally PPF film 108 may also be provided on the substrate 100 as shown in FIG. 1. In the FIG. 1 example, the SiAl-based metallic layer 102 is in direct contact with the glass substrate 100 and possibly with protective layer 104, although it is possible that other layer(s) may be provided therebetween.

SiAl layer 102 may contain, on a weight % basis, from 70-99.98% Si (more preferably from 75-99.5%, even more preferably from 75-99%, and most preferably from 85-98% Si), and from 0.02-30% Al (more preferably from 0.2-25%, even more preferably from 1-25%, and most preferably from 2-15% Al). It has been found that too much Al harms the stability of the Si in the layer 102, so the above ranges of Si and Al are preferred for layer 102 in example embodiments. Adding the Al to the Si is advantageous in that it increases the reflectance of the layer 102 compared to if the layer 102 was only Si. It will be appreciated that amounts (e.g., small amounts) of other material(s) may also be present in SiAl layer 102 in certain example embodiments of this invention.

Glass substrate 100 may be soda-lime-silica based glass, and may be from about 1-10 mm thick, more preferably from about 2-6 mm thick, in example embodiments of this invention. SiAl layer 102 may be from about 100-1,000 Å (angstroms) thick, more preferably from about 150-500 Å thick, more preferably from about 180-300 Å thick, even more preferably from about 200-300 Å thick, and most preferably from about 220-250 Å thick, It has been found that reflective properties of layer 102 deteriorate if the SiAl layer 102 is thicker than 300 Å or is thinner than 180 Å. Thus, it has surprisingly been found that the best reflectance is achieved from SiAl layer 102 when the SiAl layer 102 is from about 180-300 Å thick, and most preferably from about 220-250 Å thick.

Sputter-deposited transparent protective dielectric layer 104 (e.g., of or including one or more of silicon nitride, silicon oxynitride, aluminum nitride, aluminum oxynitride, aluminum oxide, and/or titanium nitride), if provided, may be from about 50-1,000 Å thick, more preferably from about 100-400 Å thick, in certain example embodiments.

In example embodiments, SiAl layer 102 has a visible transmission of from about 10-36% (more preferably from about 12-32%), and a visible reflectance of from about 40-75% (more preferably from about 43-65%). Thus, the mirrors shown in FIGS. 1-3 may have a visible transmission of from about 5-36%, more preferably from about 10-34%, more preferably from about 12-32%. And the mirrors shown in FIGS. 1-3 may have a visible film side reflectance of from about 45-75%, more preferably from about 48-65%; and a visible glass side reflectance of from about 40-70%, more preferably from about 42-55%, and most preferably from about 44-53%.

FIG. 2 is a cross sectional view of an example second surface mirror according to an example embodiment of this invention. It will be appreciated that the mirror coating in FIG. 2 may be the same as shown and described with respect to FIG. 1, although it will also be appreciated that layer 104 and/or layer 108 need not be present. The mirror in FIG. 2 is a second surface mirror, because the incident light first passes through glass substrate 100 before it is reflected by SiAl based reflective layer 102.

FIG. 3 is a cross sectional view of an example first surface mirror according to an example embodiment of this invention. It will be appreciated that the mirror coating in FIG. 3 may be the same as shown and described with respect to FIG. 1, although it will also be appreciated that as shown in FIG. 3 layers 104 and 108 need not be present. The mirror in FIG. 3 is a first surface mirror, because the incident light is reflected by SiAl based reflective layer 102 before it reaches the glass substrate 100. It may be desirable to not have layer 104 and 108 in first surface mirror applications, in order to improve the reflectance by layer 102.

In the FIG. 1-3 embodiments, the SiAl layer 102 may be deposited on glass substrate 100 in any suitable manner, such as via magnetron DC or RF sputtering. For example, the sputtering of SiAl inclusive layer 102 may be done at room or elevated temperature, in a pure or substantially pure argon gas atmosphere, for example at about 2-20 mTorr (e.g., at pressure of about 3 mTorr).

Certain example embodiments may optionally incorporate a permanent protective film (PPF) 108 with high adhesion levels, good chemical resistance, and/or excellent environmental durability. The protective film may be resistant to delamination from moisture penetration and/or the use of asphalitic based adhesives applied to the exterior surface of the protective film. Adhesive strengths of the protective films may be greater than or equal to 150 cN/20 mm wide strip, more preferably 275 cN/20 mm wide strip, as measured in a tape removal test. For instance, certain example embodiments may have an adhesive strength of 200-500 cN/20 mm wide strip, more preferably 200-300 cN/20 mm wide strip. In certain example embodiments, the PPF may be thin, e.g., having a thickness of <200 microns, and sometimes about 40-100 microns in thickness. Peel strength may be increased through the incorporation of additional cross-linking polymers in certain example embodiments. Example protective films 108 from Nitto-Denko include: SPV-9310, SPV-9320, SPV-30800, SPV 5057 A5, and SPV 5057 A7. Other manufacturers of similar preferred protective films include Permacel, Tessa Tapes, B&K Films, and Novacell. These plastic films come in a wide variety of opacities and colors.

While a layer, layer system, coating, or the like, may he said to be "on" or "supported by" a substrate, layer, layer system, coating, or the like, other layer(s) may be provided therebetween. Thus, for example, the coatings or layers described above may be considered "on" and "supported by" the substrate and/or other coatings or layers even if other layer(s) are provided therebetween.

In example embodiments of this invention, there is provided a mirror, comprising: a glass substrate; a metallic or substantially metallic reflective layer comprising silicon aluminum provided on the glass substrate; and wherein the layer comprising silicon aluminum comprises, on a weight basis, from 70-99.98% silicon and from 0.02-30% aluminum.

In the mirror of the immediately preceding paragraph, the layer comprising silicon aluminum may consist essentially of silicon aluminum.

In the mirror of any of the preceding two paragraphs, the layer comprising or consisting essentially of silicon aluminum may comprises, on a weight basis, from 75-99% silicon and from 1-25% aluminum, more preferably from 85-98% silicon and from 2-15% aluminum.

In the mirror of any of the preceding three paragraphs, the layer comprising or consisting essentially of silicon aluminum may be from 100-500 Å thick, more preferably from 130-300 Å thick.

In the mirror of any of the preceding four paragraphs, the mirror may optionally contain no layer on the glass substrate over the layer comprising or consisting essentially of silicon aluminum.

In the mirror of any of the preceding five paragraphs, the mirror and/or the layer comprising or consisting essentially of silicon aluminum may have a visible transmission of from about 10-36%, more preferably from about 12-32%.

In the mirror of any of the preceding six paragraphs, the layer comprising or consisting essentially of silicon aluminum may have a visible reflectance of from about 40-75%.

In the mirror of any of the preceding seven paragraphs, the layer comprising or consisting essentially of silicon aluminum may be in direct contact with the glass substrate.

In the mirror of any of the preceding eight paragraphs, the layer comprising or consisting essentially of silicon aluminum may be a sputter-deposited layer.

The mirror of any of the preceding nine paragraphs may further comprise at least one protective layer provided on the glass substrate over the layer comprising or consisting essentially of silicon aluminum.

The mirror of any of the preceding ten paragraphs may be a first surface mirror or a second surface mirror.

The mirror of any of the preceding eleven paragraphs may further include a dielectric layer (e.g., of or including silicon nitride and/or silicon oxynitride) located between the glass substrate and the metallic or substantially metallic reflective layer comprising silicon aluminum.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mirror, comprising:
   a glass substrate;
   a metallic or substantially metallic reflective layer comprising silicon aluminum provided on the glass substrate;
   wherein the layer comprising silicon aluminum comprises, on a weight basis, from 70-99.98% silicon and from 0.02-30% aluminum; and
   at least one protective layer comprising silicon nitride provided on the glass substrate over the layer comprising silicon aluminum.

2. The mirror of claim 1, wherein the layer comprising silicon aluminum consists essentially of silicon aluminum.

3. The mirror of claim 1, wherein the layer comprising silicon aluminum comprises, on a weight basis, from 75-99% silicon and from 1-25% aluminum.

4. The mirror of claim 1, wherein the layer comprising silicon aluminum comprises, on a weight basis, from 85-98% silicon and from 2-15% aluminum.

5. The mirror of claim 1, wherein the mirror contains no layer on the glass substrate over the layer comprising silicon aluminum.

6. The mirror of claim 1, wherein the layer comprising silicon aluminum is from 100-500 Å thick.

7. The mirror of claim 1, wherein the layer comprising silicon aluminum is from 130-300 Å thick.

8. The mirror of claim 1, wherein the mirror and/or the layer comprising silicon aluminum has a visible transmission of from about 10-36%.

9. The mirror of claim 1, wherein the mirror and/or the layer comprising silicon aluminum has a visible transmission of from about 12-32%.

10. The mirror of claim 1, wherein the layer comprising silicon aluminum has a visible reflectance of from about 40-75%.

11. The mirror of claim 1, wherein the layer comprising silicon aluminum is in direct contact with the glass substrate.

12. The mirror of claim 1, wherein the layer comprising silicon aluminum is a sputter-deposited layer.

13. The mirror of claim 1, wherein the mirror is a first surface mirror.

14. The mirror of claim 1, wherein the mirror is a second surface mirror.

15. The mirror of claim 1, further comprising a dielectric layer located between the glass substrate and the metallic or substantially metallic reflective layer comprising silicon aluminum.

16. The mirror of claim 15, wherein the dielectric layer comprises silicon nitride.

* * * * *